United States Patent

Smith, Jr.

[15] 3,673,557
[45] June 27, 1972

[54] DISCONTINUOUS COHERENT WAVE ACOUSTIC HOLOGRAPHY

[72] Inventor: Noyes D. Smith, Jr., Bellaire, Tex.

[73] Assignee: Shell Oil Company, New York, N.Y.

[22] Filed: Feb. 3, 1970

[21] Appl. No.: 8,206

Related U.S. Application Data

[63] Continuation-in-part of Ser. No. 659,984, Aug. 8, 1967, Pat. No. 3,503,037.

[52] U.S. Cl. .........................................340/15.5 H
[51] Int. Cl. .............................................G01v 1/34
[58] Field of Search ..................340/15.5, 15.5 H; 181/.5

[56] References Cited

UNITED STATES PATENTS

| 3,461,420 | 8/1969 | Silverman | 340/1 |
| 3,474,404 | 10/1969 | Silverman | 340/15.5 |
| 3,484,740 | 12/1969 | Cook | 340/15.5 |

*Primary Examiner*—Benjamin A. Borchelt
*Assistant Examiner*—N. Moskowitz
*Attorney*—Theodore E. Bieber and J. H. McCarthy

[57] ABSTRACT

The response to deep reflecting layers in an acoustic hologram is improved by varying the time at which acoustic wave relating to to various images are radiated either by pulsing the source of coherent waves or turning the source off after a steady state has been established and gating the receivers so that acoustic waves relating to very strong and very weak images are not being received at the same time.

2 Claims, 6 Drawing Figures

INVENTOR:
NOYES D. SMITH, JR.

DISCONTINUOUS COHERENT WAVE ACOUSTIC HOLOGRAPHY

CROSS-REFERENCE TO RELATED APPLICATIONS

This application is a continuation-in-part of a copending application of N. D. Smith, Jr., Ser. No. 659,984 filed Aug. 8, 1967 and entitled Holographic Seismic Exploration, now U.S. Pat. No. 3,503,037.

BACKGROUND OF THE INVENTION

Reflection seismology for the exploration of the sedimentary layers of the earth to great depths (15 to 20,000 feet) depends on the following properties of the rocks:
1. Various geological strata of interest having different acoustic impedances.
2. The variations in the strata are not too great and reflection coefficients are usually 0.01 or less and only in unusual cases reaches 0.05 to 0.10.
3. Attenuation is sufficiently low for frequencies below 60 Herz that signals above noise can be recorded over path lengths of 40,000 feet.
4. At wave-lengths corresponding to these frequencies the layers are remarkably smooth and hence the layers reflect specularly.

The thickness of layering varies from very small, fractions of an inch, to large statistically homogeneous layers of fifty feet or more. Averaged properties over thicknesses of the order of say one-tenth of a wave-length show contrasts with spatial wavelengths from one-tenth wave-length to several wavelengths. Because of spherical spreading and attenuation the ratio of the amplitude of the first arrival refracted waves, trapped surface waves and direct waves to the deeply reflected wave amplitues are in the range 80 of 100 db.

The object of seismic surveying is to determine the geometry of the surface delineating changes in the elastic properties of the rocks so that the geological structure and structural history can be ascertained.

The advantages of seismic holography over conventional seismic surveys are as follows:
1. The wave arrival time — three dimensional volume data of normal seismic surveying is reduced to a three dimensional display of images of the source in reflectors and diffracting points.
2. Signal-to-noise is improved since the coherent data are concentrated in space to the images.
3. The images are located in space equivalent to a constant velocity migration of the reflector space.

Problems which must be solved to make useful seismic holograms are as follows:
1. No recording medium is available with the necessary dynamic range to record useful seismic holograms directly as a transparency for optical reproduction. Hence, means must be provided to reduce the range required to preserve the deeper weaker images.
2. The distortions due to irregular surface layers and topography must be corrected.
3. Because of the enormous difference between the seismic wavelengths (20 –300 feet) for which the seismic hologram is recorded and the optical wavelengths ($10^{-6}$ feet) with which it is reproduced, large magnifications of the vertical scale exist in the optical reproduction.

In the elastic half-space for which the seismic hologram is recorded, the reflecting laters are closely spaced and hence the seismic images are frequently a fraction to a few wavelengths apart. By using a large reference signal the interference produced by closely spaced coherent images is essentially eliminated in the hologram. However, the coherent reconstructed images will produce interference fringes. If the vertical exaggeration is large, the fringes will be closely spaced and the overlapping of the many fringe systems will average to a background to which will decrease the contrast but not obscure the images. However, if the images are close, broader fringes with greater contrast will exist.

BRIEF SUMMARY OF THE INVENTION

In a hologram constructed from elastic waves generated by a continuous source of elastic waves received at a plurality of points on the surface, the ratio of the amplitudes of the surface and direct waves to the amplitudes of images in deep reflecting layers can be as large as 80 to 100 db. It is not possible to prepare a transparency for optical reconstruction directly because of the limited dynamic range of photographic and photochromic materials. The process of this invention is to vary the time at which different images radiate by pulsing the source and gating the reception so that very strong and very weak images are not radiating and being received at the same time. The duration of the pulse must be sufficiently long that the signals received are substantially coherent. In a preferred embodiment, after a steady state is established, the source is turned off and the hologram is sampled at a plurality of surface locations as a function of the time elapsed since the source was turned off. Thus at a given time interval only those images are radiating that have travel times from source to receiver location greater than the lapsed time. A programmed gain in each amplifier is initiated in relation to the turning off of the source and the relative location of the receiving seismometer. In a second embodiment the source is operated for a short interval so that as time progresses, images lying within the time interval of the pulse are sequentially illuminated and can thus be recorded at sequential times.

The objective of this invention is to provide a method of reducing the dynamic range required and to improve the signal noise of the seismic hologram so that images in deep reflecting surfaces or diffracting discontinuities can be reconstructed optically. The objective of this invention is accomplished by establishing a steady state with a continuous coherent source and recording elements of a seismic hologram at a plurality of surface locations as a function of the time after the continuous source has been turned off. By using the values of the recorded elements at a selected time, a hologram is obtained for those images which are still radiating at the selected time. Such a hologram, for a time after the refracted direct and surface waves have died out, will have a dynamic range which makes it possible to construct a transparency suitable for optical reconstruction. To improve the signal to noise ratio, a programmed gain amplifier is actuated at the time the signal generator is turned off.

In a second embodiment, the coherent source is operated for a short time interval so that only a group of images are illuminated at the same time. As time progresses, successive groups of images at progressively greater depths are illuminated. A programmed gain amplifier makes it possible to record the weak images with a better signal-to-noise ratio.

BRIEF DESCRIPTION OF THE DRAWINGS

The invention will be more easily understood from the following detailed description of a preferred embodiment when taken in conjunction with the attached drawings in which:

In FIG. 1 a continuous source of elastic waves 1 is placed at the origin of a coordinate system with the $xy$ plane lying on the surface of an elastic half-space. A seismometer 2 at $x$ receives signals from image points 3 and 4. A reference wave voltage corresponding to a plane wave in the $xy$ plane is provided. Let $A_1$ be the amplitude of the direct wave and $A_2$ and $A_3$ the amplitudes of the image points. Let $A(x,t)$ be amplitude of the combined signals and reference at $x$. Then $$A(x,t) = \frac{A_1}{x} \sin(wt+kx) + \frac{A_2}{r_2} \sin(wt+kr_2)$$
$$+ \frac{A_3}{r_3} \sin(wt+kr_3) + A_R \sin wt.$$

$$A^2(x,t) = \frac{A_1^2}{x^2} \sin^2(wt+kx) + \frac{A_2^2}{r_2^2} \sin^2(wt+kr_2)$$
$$+ \frac{A_3^2}{r_3^2} \sin^2(wt+kr_3) + A_R^2 \sin^2(wt) + 2A_R\frac{A_1}{x} \sin(wt+kx) \sin wt + \frac{2A_R}{r_2} A_2 \sin(wt+kr_2) \sin wt$$
$$+ \frac{2A_R A_3}{r_3} \sin(wt+kr_3) \sin wt + \frac{2A_1 A_2}{xr_2} \sin(wt+kx) \sin(wt+kr_2) + \frac{2A_1 A_3}{xr_3} \sin(wt+kx) \sin(wt+kr_3)$$
$$+ \frac{2A_2 A_3}{r_2 r_3} \sin(wt+kr_2) \sin(wt+kr_3).$$

Choose $A_R \gg A_1, A_2, A_3$ so that terms not involving $A_R$ can be neglected. Average with respect to time. The resulting hologram is $$H(x) = \frac{A_R^2}{2} + \frac{A_R A_1}{X} \cos kx + \frac{A_R A_2}{r_2} \cos kr_2 + \frac{A_R A_3}{r_3} \cos kr_3$$

Figure 1:
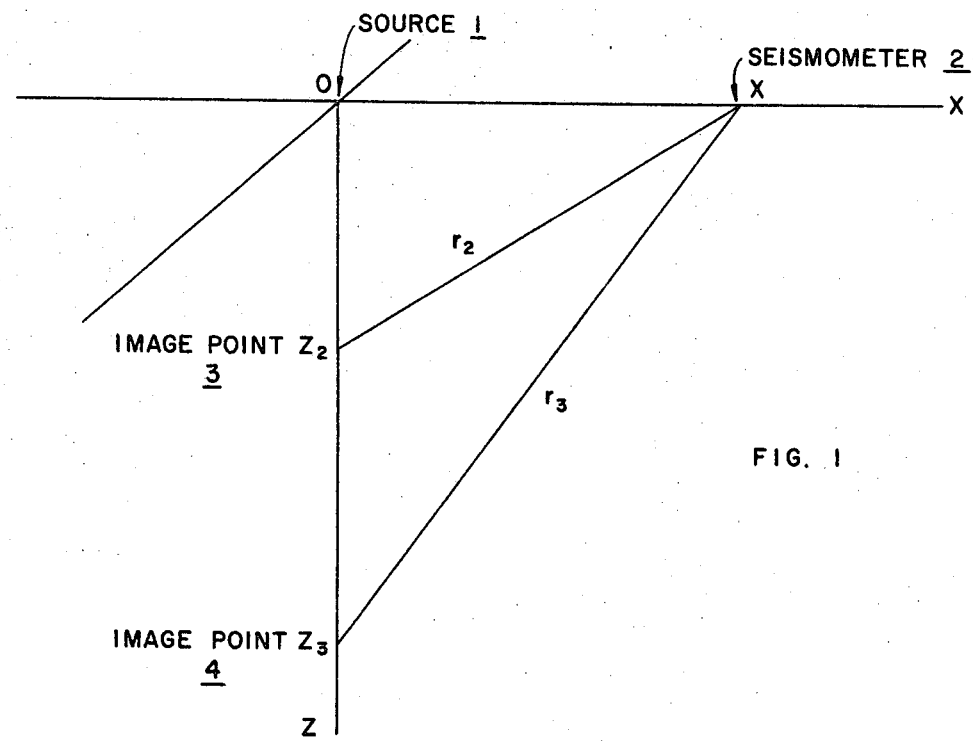
FIG. 1 is a simplified diagram showing a source, two image points, and a receiving location.
Figure 2:
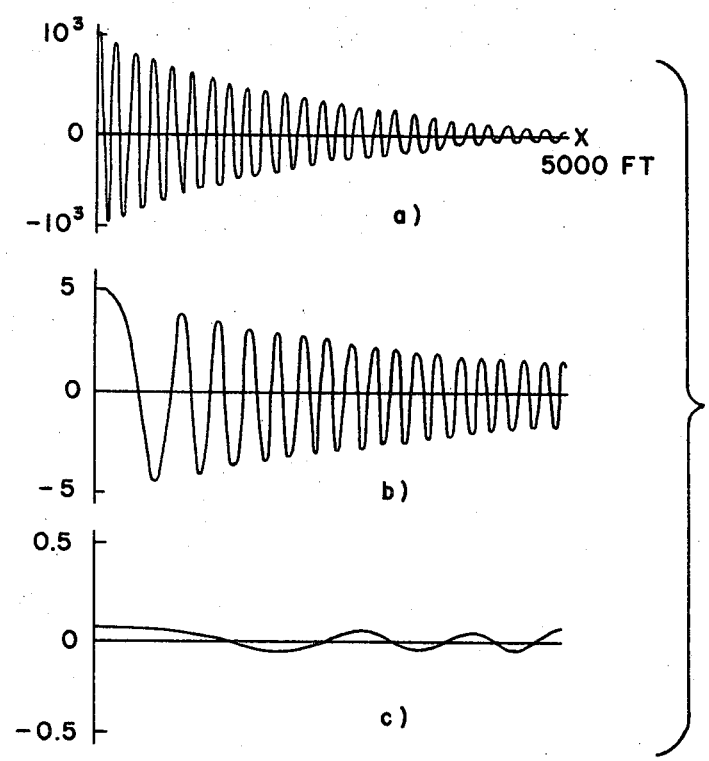
FIG. 2 shows schematically the holographic fringe systems produced by the direct wave and the two image points and their relative amplitudes.

For the purpose of illustration FIG. 2a) shows the variable parts of the fringe system due to the direct wave, 2b) the fringe system due to image point 3 and 2c) the fringe system due to image point 4 for the following values of the parameters:
$A_1 = 100$, $A_2 = 10$, $A_3 = 1$, $A_R = 1000$
$K = \pi/100$, velocity $= 6060$ feet per second
$z_2 = 2,000$ feet, $z_3 = 20,000$ feet. The scales show the large range in amplitudes of the order of $10^4$ to 1.

Figure 3:
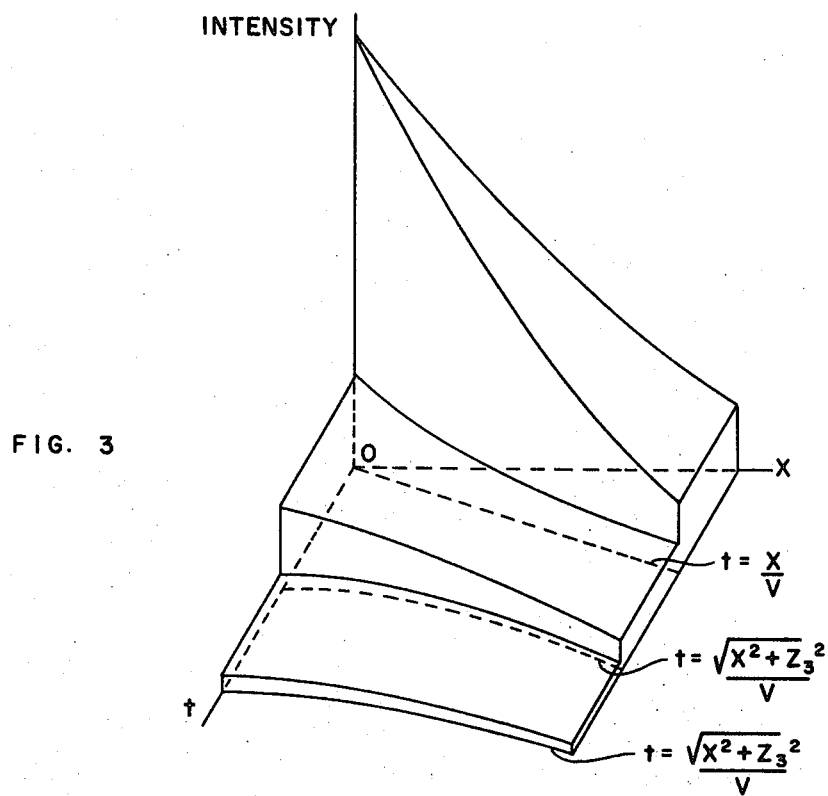
FIG. 3 shows qualitatively the envelope of the hologram as a function of distance from the source and time after the source is turned off.

In FIG. 3 on the $x$, $t$ plane the arrival times for signals starting at $t = 0$, $x = 0$ are shown. On the vertical axis is shown schematically the envelope of the hologram and how it changes in time after the source is turned off. If the values at a given elapsed time are used as a hologram its reconstruction would show only those images that were still illuminated. In a practical case, there will be a large number of images and even though they will in general not be vertically below the source, it is preferred to choose values along an arrival time curve.

Figure 4:
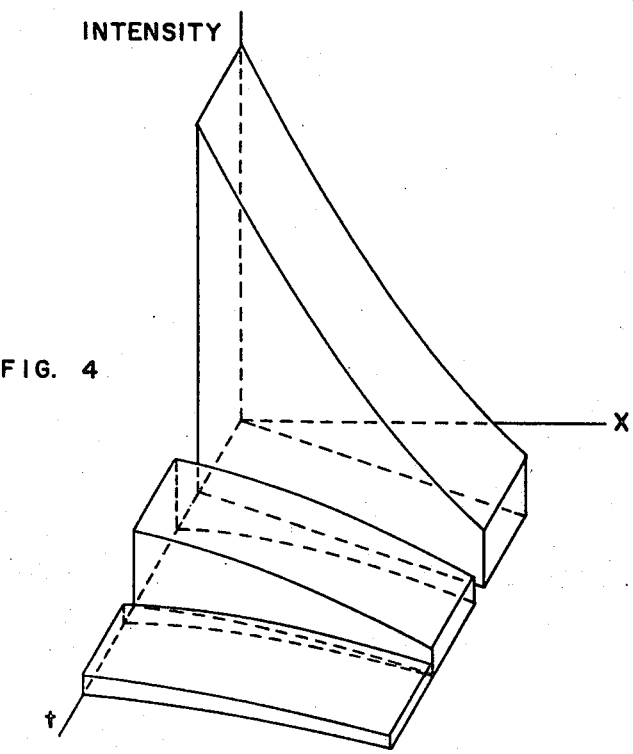
FIG. 4 shows the envelope of the hologram as a function of distance from the source and time for a pulse.

FIG. 4 shows schematically the envelope of the hologram for a short wave-train as a function of $x$ or $t$. Again a hologram constructed for times along an arrival-time curve will, when reconstructed, show only images illuminated during the time-width of the wave-train.

In these simplified examples a plane horizontal reference wave was used for simplicity, but tilted plane or spherical references waves can be used as desired.

Figure 5:
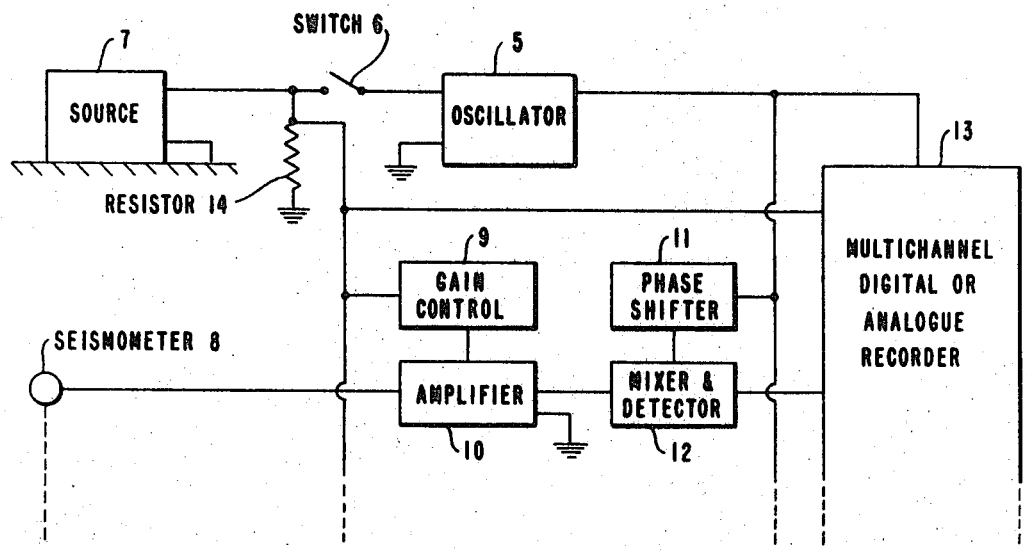
FIG. 5 shows schematically circuits to carry out the methods of the invention.
Figure 6:
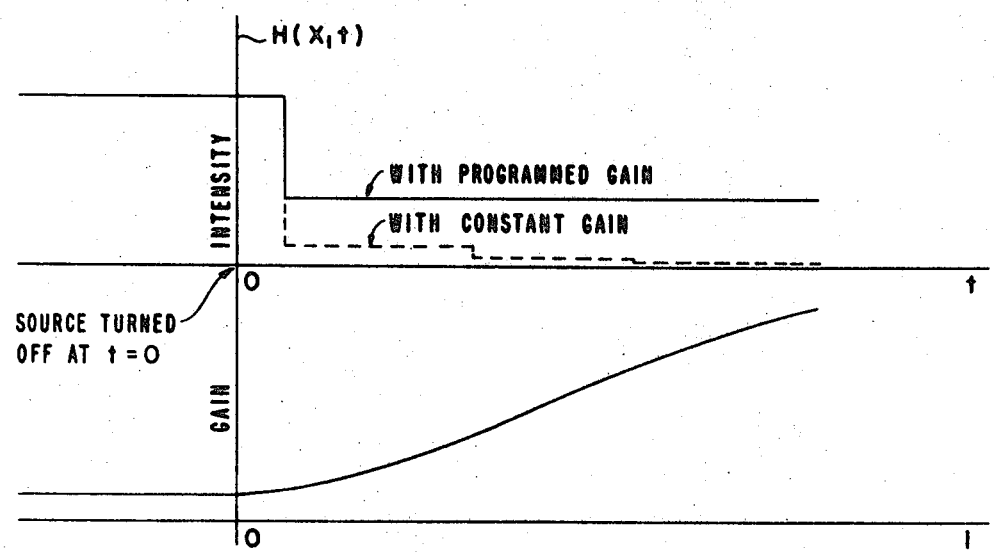
FIG. 6 shows schematically the effects produced by a programmed gain control.

FIG. 5 shows a schematic circuit to accomplish the recording of the hologram as a function of the time and with a programmed gain control. Oscillator 5 drives source 7 when switch 6 is closed. After a steady state has been established the signal at seismometer 8 is constant. This signal is amplified by amplifier 10 and mixed with a reference signal from oscillator 5 properly phase shifted to correspond with the location of seismometer 8 in mixer and detector circuit 12. The output is recorded on the recorder 13 along with signals from other seismometers. If a digital recorder is used, the mixer and detector would include a digitizer. Switch 16 is opened stopping source 7. The absence of voltage across resistor 14 starts the programmed gain control 9 and the multichannel recorder. FIG. 6 shows schematically how the programmed gain control produces nearly a constant intensity in the hologram.

For pulsed operation switch 6 is closed for a short interval to produce a wave-train. The circuits in the gain control and recorder are modified to start when a voltage appears across resistor 14. The length of the wave-train must be sufficiently long that it is coherent enough for fringes to exist over the required aperature and yet short enough that the large signal from direct waves will have died out before the times at which a hologram is desired. The frequency spread due to a finite wave-train is approximately inversely proportional to the time width of the wave-train. The limiting aperture can be defined as the aperture at which the two boundary frequencies have a relative phase difference of $\pi$. If an image is at depth $z$ and observed at $x$, the variable part of a hologram for wave-length $\lambda$ is $\cos 2k/\lambda (r-z)$. Thus for $f_1$ and $f_2$, corresponding to $\lambda_1$ and $\lambda_2$, $$\frac{2\pi}{\lambda_1}(r-z) - \frac{2\pi}{\lambda_2}(r-z) = \pi, \quad \left(\frac{1}{\lambda_1} - \frac{1}{\lambda_2}\right)(r-z) = \frac{1}{2}$$

Since $\lambda = V/f$ where V = velocity;
$(f_1 - f_2)(r-z) = V/2 = \Delta f(r-z)$ $$r - z = \frac{V}{2\Delta f}$$

$$r = \frac{V}{2\Delta f} + z$$

$$x^2 + z^2 = \frac{V^2}{4\Delta f^2} + \frac{Vz}{\Delta f} + z^2$$

$$x^2 = \frac{V^2}{4\Delta f^2} + \frac{Vz}{\Delta f}$$

Define angular aperture $\alpha$ as twice $\tan^{-1} \frac{x}{z}$ $$\frac{x}{z} = \tan\frac{\alpha}{2} \sqrt{\frac{V^2}{4\Delta f^2 z^2} + \frac{V}{\Delta f z}}$$

Since $$\Delta f = \frac{1}{\Delta t} \text{ and } \Delta t = pT = \frac{p}{f}$$

where $p$ = number of cycles in wave-train $$\tan\frac{\alpha}{2} = \sqrt{\frac{p^2 V^2}{4f^2 z^2} + \frac{pV}{fz}}$$

For example with $f=30$ cycles per second, $V=6000$ feet per second $p=10$ and $Z=1,000$ feet, $$\tan\frac{\alpha}{2} = \sqrt{\frac{10^2 \cdot 36 \times 10^6}{4 \times 9 \times 10^1 \times 10^6} + \frac{10 \times 6 \times 10^3}{3 \times 10 \times 10^3}} = \sqrt{12} = 3.4641$$

$$\frac{\alpha}{2} = 73.90$$

The larger the number of cycles $p$, the greater the angle for a given depth. However, if $p$ is large, the direct wave will last so long that images for depths less than a critical depth cannot be observed by themselves.

Let $t_d$ be the time for the direct wave to reach $x$ and $t_z$ be the time for a wave from an image at $z$ to reach $x$.
$t_d = x/V$
$t_z = \sqrt{x^2 + z^2}/V$ where $V$ = velocity of the wave.
If $P$ is the number of cycles in the wave-train, the time width of the pulse is $p/f$ where $f$ = frequency. For a given $z$ the maximum distance $x$ where the arrival from $z$ can be observed after the direct wave has passed is determined by $t_z = t_d + p/f$ $$\frac{\sqrt{x^2 + z^2}}{V} = \frac{x}{V} + \frac{p}{f}$$

$$\frac{x^2}{V^2} + \frac{z^2}{V^2} = \frac{x^2}{V^2} + \frac{2px}{Vf} + \frac{p^2}{f^2}$$

$$x = \frac{fz^2}{2Vp} - \frac{Vp}{2f}$$

From above the value of $x$ which satisfies the coherence requirement for a given $p$ is $$x = \sqrt{\frac{V^2p^2}{4f^2} + \frac{Vpz}{f}}$$

Equating and squaring both sides $$\frac{f^2z^4}{4V^2p^2} - \frac{z^2}{2} + \frac{V^2p^2}{4f^2} = \frac{V^2p^2}{4f^2} + \frac{Vpz}{f}$$

$$\frac{f^2z^2}{4V^2p^2} - \frac{z^2}{2} - \frac{Vpz}{f} = 0$$

$$z^4 - \frac{2V^2p^2}{f^2}z^2 - \frac{4V^3p^3z}{f^3} = 0$$

$$z\left[z^3 - \frac{2V^2p^2}{f^2}z - \frac{4V^3p^3}{f^3}\right] = 0$$

The cubic equation for $z$ has one real root and two conjugate complex roots. The real root is $$z = \frac{2Vp}{f}$$

Substituting this value of $f$ in an equation for $x$, $$x = \frac{fz^2}{2pV} - \frac{Vp}{2f}$$

$$x = \frac{3}{4}z$$

These values of $p$ and $x$ fulfill the conditions that the direct wave has passed and that interference fringes exist to the distance $x$ for a chosen $z$. These values are important for the shallowest depth image it is desired to observe. For deeper depths the angular aperture decreases and no problem arises.

The present invention improves a process for forming the interference pattern of a hologram by illuminating an object with a coherent elastic wave, receiving waves that are diffracted and reflected from the object at a plurality or really dispersed receiving stations with signals relating to a reference wave that is appropriately phased. The improvement is effected by (a) producing and then terminating the production of the coherent elastic wave and (b) mixing the signals relating to the reference wave with those relating to the receptions at the receiving stations at a selected time after the termination of the production of the coherent wave at which time waves are being received from a portion of the illuminated object at a selected relatively long distance from the receiving stations.

In one embodiment of the present invention, the production of the coherent wave is terminated after a steady state has been established and the waves which are received at the receiving locations are amplified by increasing amounts in accordance with a programmed gain control. In another embodiment, starting and stopping of the production of the coherent wave is timed to produce a relatively short train of coherent wave energy and the receptions of waves at the receiving stations is gated to receive waves only during the appearances of waves that are returning from a portion of the illuminated object that is located at a selected relatively long distance from the receiving stations.

I claim as my invention:

1. A process for seismic surveying by producing an acoustic hologram of an underground feature comprising:

illuminating the feature with a steady source of coherent elastic waves until steady state conditions are achieved and then terminating the illumination;

receiving at a preselected time after the termination the waves that are reflected from the feature and converting the received waves to a related electrical signal;

mixing the related signal with a reference signal corresponding to said coherent elastic waves and recording the mixed signal; and, utilizing the recorded signal to form a holographic image.

2. A process for seismic surveying by producing an acoustic hologram of an underground feature comprising the steps of:

illuminating the feature with a pulsed source of coherent elastic waves, a given pulse being of sufficient time duration to provide substantial coherency and terminating at a given time;

receiving the waves that are reflected from the feature, beginning at a preselected time after the termination of the pulse to avoid direct waves, and converting the received waves to a related electrical signal;

mixing the related signal with a reference signal corresponding to said coherent elastic waves, and recording the mixed signal; and utilizing the recorded signal to form a holographic image.

* * * * *